United States Patent
Iwami et al.

(10) Patent No.: US 7,845,652 B2
(45) Date of Patent: Dec. 7, 2010

(54) SUSPENSION STRUCTURE FOR A WORK MACHINE

(75) Inventors: Kenichi Iwami, Sakai (JP); Shigeki Hayashi, Sakai (JP); Yoshihiro Ueda, Sakai (JP)

(73) Assignee: Kubota Corporation, Osaka (JP)

( * ) Notice: Subject to any disclaimer, the term of this patent is extended or adjusted under 35 U.S.C. 154(b) by 179 days.

(21) Appl. No.: 12/062,162

(22) Filed: Apr. 3, 2008

(65) Prior Publication Data

US 2009/0020975 A1 Jan. 22, 2009

(30) Foreign Application Priority Data

Jul. 20, 2007 (JP) .............................. 2007-189612

(51) Int. Cl.
*B60G 17/00* (2006.01)

(52) U.S. Cl. ................................. 280/6.151

(58) Field of Classification Search ....... 280/6.15–6.16, 280/124.158, 124.159, 124.16, 5.514, 5.515
See application file for complete search history.

(56) References Cited

U.S. PATENT DOCUMENTS

| | | | |
|---|---|---|---|
| 3,831,969 A * | 8/1974 | Lindblom | ................ 280/5.509 |
| 3,917,295 A | 11/1975 | Hiruma | |
| 4,829,436 A * | 5/1989 | Kowalik et al. | ................ 701/37 |
| 5,076,606 A * | 12/1991 | Takahashi | ............ 280/124.161 |
| 5,450,322 A * | 9/1995 | Tanaka et al. | ................. 701/37 |
| 6,145,859 A | 11/2000 | Altherr et al. | |
| 6,282,470 B1 * | 8/2001 | Shono et al. | ................... 701/37 |
| 7,441,782 B2 * | 10/2008 | Stiller | ..................... 280/6.153 |
| 2007/0040344 A1 * | 2/2007 | Stiller | ................. 280/124.157 |

FOREIGN PATENT DOCUMENTS

| | | |
|---|---|---|
| CN | 1169923 A | 1/1998 |
| JP | 60-255515 | 12/1985 |
| JP | 61-054309 | 3/1986 |
| JP | 08-108722 | 4/1996 |
| JP | 10-016528 A | 1/1998 |

* cited by examiner

*Primary Examiner*—Faye M. Fleming
(74) *Attorney, Agent, or Firm*—The Webb Law Firm

(57) ABSTRACT

An arrangement is provided in which the durability of an operation changing means is improved when this means is provided to the suspension mechanism in a suspension structure for a work vehicle. A maximum position (A1) and minimum position (A2) of the operation of the suspension mechanism are detected, and an intermediate position (B1) between the maximum and minimum positions (A1) and (A2) is detected. When the intermediate position (B1) departs from the target range (H1), the operation of the suspension mechanism is changed to the body raising side or body lowering side so that the intermediate position (B1) moves toward the target range (H1).

6 Claims, 5 Drawing Sheets

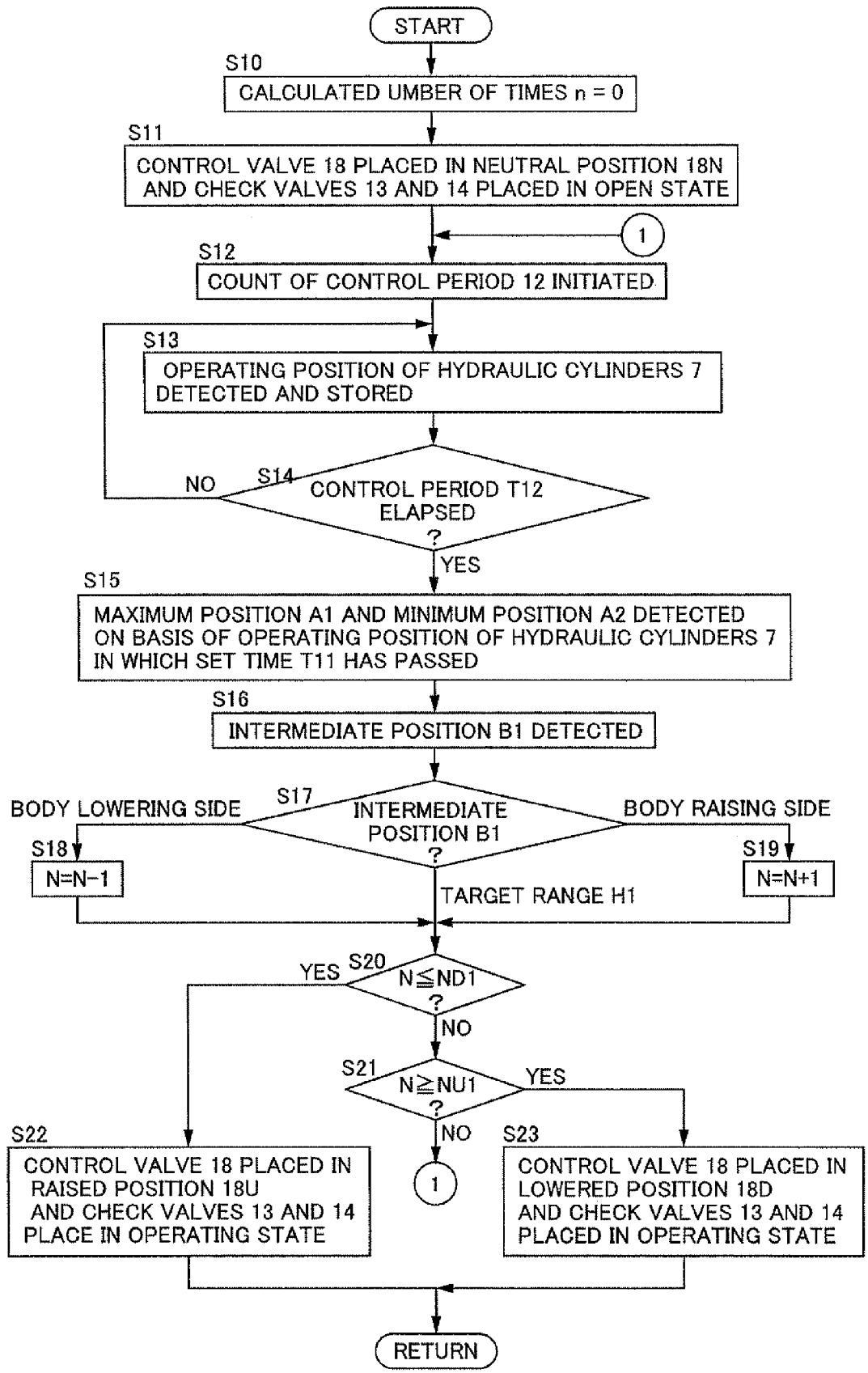

SUSPENSION STRUCTURE FOR A WORK MACHINE

BACKGROUND OF THE INVENTION

1. Field of the Invention

The present invention relates to a suspension structure for a work machine such as a farm tractor or the like.

2. Description of the Related Art

Farm tractors, which constitute one example of a work machine, include tractors that have a front-wheel suspension mechanism, as disclosed, for example, in U.S. Pat. No. 6,145,859. Suspension mechanisms are generally mechanisms which absorb indentations and protrusions in the ground surface by operating on the raising side and lowering side in accordance with such indentations and protrusions in the ground surface, and thus improve the riding comfort.

Because of numerous indentations and protrusions in the operating area over which the work vehicle runs compared to paved roadways, and because a working apparatus is usually mounted on a work vehicle, the operating position of the suspension mechanism may be displaced from the target range on the body raising side or body lowering side (when the operating position of the suspension mechanism is positioned in the target range, the vehicle height is in a specified height range). Consequently, the vehicle height varies from the specified height range.

In this case, in a work vehicle, it is desirable that variations in the vehicle height be minimized and that the vehicle height be maintained in a specified height range. Accordingly, a mechanism (operation changing unit) is provided for moving the operating position of the suspension mechanism toward the target range in cases where the operating position of the suspension mechanism is displaced on the body raising side or the body lowering side as described above, and this is constructed so that the vehicle height is maintained as far as possible in the specified height range.

SUMMARY OF THE INVENTION

In cases where an operation changing unit is provided for the suspension mechanism in a work vehicle as described above, and an arrangement is provided so that the operation changing unit is actuated each time the suspension mechanism is operated and the operating position of the suspension mechanism is displaced on the body raising side or body lowering side from a target range, the operating frequency of the operation changing unit is greatly increased. Accordingly, this is greatly disadvantageous from the standpoint of the durability of the operation changing unit.

It is an object of the present invention to construct the operation changing unit so that this operation changing unit is advantageous from the standpoint of the durability in cases where such a unit is provided to the suspension mechanism in the suspension structure of a work vehicle.

The suspension structure for a work vehicle provided by the present invention comprises an operation changing unit which has a suspension mechanism for vehicle operation and which allows the operation of the suspension mechanism to be changed to a body raising side or body lowering side; an intermediate position detection unit for detecting a maximum position and minimum position of the operation of the suspension mechanism, and detecting an intermediate position between the maximum position and minimum position; and a controller for operating the operation changing unit; wherein the controller operates the operation changing unit so that the intermediate position moves toward a target range when the intermediate position departs from the target range.

In the construction described above, in cases where an operation changing unit that is able to change the operation of the suspension mechanism toward the body raising side or body lowering side is provided, even if the suspension mechanism is actuated and the operating position of the suspension mechanism is displaced from the target range toward the body raising side or body lowering side, there is no immediate operation of the operation changing unit.

In cases where the operating position of the suspension mechanism is displaced toward the body raising side or body lowering side from the target range, the operating position of the suspension mechanism is displaced toward the body lowering side after being displaced toward the body raising side, or is displaced toward the body raising side after being displaced toward the body lowering side, and the maximum position or minimum position is generated in the operation of the suspension mechanism.

In the abovementioned construction, the maximum position and minimum position of the operation of the suspension mechanism are detected, an intermediate position between the maximum and minimum positions is detected, and the intermediate position is compared with the target range.

Consequently, when the intermediate position departs from the target range, the operation changing unit is actuated so that the intermediate position moves toward the target range, and even if the operating position of the suspension mechanism is displaced toward the body raising side or body lowering side from the target range, there is no operation of the operation changing unit if the intermediate position is position in the target range. Accordingly, the operating frequency of the operation changing unit can be made lower than in a construction in which the operation changing unit is actuated each time that the operating position of the suspension mechanism is displaced toward the body raising side or body lowering side.

In this case, even if the suspension mechanism is actuated and the operating position of the suspension mechanism is displaced toward the body raising side or body lowering side, the vehicle height can be viewed as being in the specified height range for a set time if the intermediate position is positioned in the target range; accordingly, it is judged that there is no need to actuate the operation changing unit.

Accordingly, in the suspension structure of the work vehicle, in cases where an operation changing unit is provided for the suspension mechanism, the frequency of operation of the operation changing unit can be reduced, a construction which is advantageous from the standpoint of the durability of the operation changing unit can be obtained, and the durability of the operation changing unit can be improved.

In the suspension structure for a work vehicle described above, it is ideal if the suspension mechanism is constructed from a hydraulic cylinder; an accumulator is connected to the oil chamber of the hydraulic cylinder; the operation changing unit has a control valve that is connected to an oil path connecting the accumulator and the oil chamber of the hydraulic cylinder, and that is capable of supplying and discharging operating oil from a pump; and the operation of the suspension mechanism is changed to the raising side of the body or lowering side of the body as a result of the control valve controlling the pressure of the oil chamber of the hydraulic cylinder.

In this construction, operating oil is caused to flow into the accumulator from the oil chamber of the hydraulic cylinder by the variation in the load applied to the hydraulic cylinder, and the hydraulic cylinder extends and retracts as a suspension mechanism as a result of the operating oil flowing into the oil chamber of the hydraulic cylinder from the accumulator. In such a hydraulic cylinder, the operation changing unit is constructed so that the operation of the suspension mechanism is changed toward the body raising side or body lowering side as a result of the pressure valve performing pressure control of the oil chamber of the hydraulic cylinder.

In this case, a control valve that is capable to supplying and discharging operating oil from the pump is connected to the oil path that connects the oil chamber of the hydraulic cylinder and the accumulator; accordingly, the oil path that connects the oil chamber of the hydraulic cylinder and the accumulator can also be used as an oil path that supplies and discharges operating oil from the pump to and from the hydraulic cylinder. Accordingly, the oil path can be made shorter than in a construction in which an oil path that connects the oil chamber of the hydraulic cylinder and the accumulator and an oil path that supplies and discharges operating oil from the pump to and from the hydraulic cylinder are separately provided.

Accordingly, in cases where the suspension mechanism is constructed from a hydraulic cylinder, and an accumulator that is used to cause an extension and retraction operation of the hydraulic cylinder as a suspension mechanism, and a control valve that is used to alter the operation of the suspension mechanism to the body raising side or body lowering side, are provided, the oil path can be reduced, and this is advantageous from the standpoint of simplifying the structure.

Furthermore, the suspension structure for a work vehicle provided by the present invention comprises an operation changing unit which has a suspension mechanism for vehicle operation and which allows the operation of the suspension mechanism to be changed to a body raising side or a body lowering side; an intermediate position detection unit for detecting a maximum position and minimum position of the operation of the suspension mechanism, and detecting an intermediate position between the maximum position and minimum position; a calculation unit for calculating a number of times that the intermediate position departs from a target range; and controller for operating the operation changing unit; wherein the controller operates the operation changing unit so that the intermediate position moves toward the target range when the number of times that the intermediate position departs from the target range exceeds a set number of times.

In this construction, in cases where a suspension mechanism and an operation changing unit that is capable of altering the operation of the suspension mechanism toward the body raising side or body lowering side is provided, then even if the suspension mechanism is actuated and the operating position of the suspension mechanism is displaced toward the body raising side or body lowering side, there is no immediate operation of the operation changing unit.

In cases where the operating position of the suspension mechanism is displaced toward the body raising side or body lowering side from the target range, the operating position of the suspension mechanism is displaced toward the body lowering side after being displaced toward the body raising side, or is displaced toward the body raising side after being displaced toward the body lowering side, and the maximum position or minimum position is generated in the operation of the suspension mechanism.

Accordingly, the maximum position and minimum position of the operation of the suspension mechanism are detected, an intermediate position between the maximum and minimum positions is detected, the intermediate position is compared with the target range, and the number of times that the intermediate position departs from the target range is calculated.

Consequently, if the number of times that the intermediate position departs from the target range exceeds the set number of times, the operation changing unit is actuated so that the intermediate position moves toward the target range, and even if the operating position of the suspension mechanism is displaced toward the body raising side or body lowering side from the target range, or even if the intermediate position is displaced toward the body raising side or body lowering side from the target range, the operation changing unit is not actuated if the number of times that the intermediate position departs from the target range does not exceed the specified number of times. Accordingly, the operating frequency of the operation changing unit can be made lower than in a construction in which the operation changing unit is actuated each time that the operating position of the suspension mechanism is displaced toward the body raising side or body lowering side from the target range.

In this case, even if the suspension mechanism is actuated and the operating position of the suspension mechanism is displaced toward the body raising side or body lowering side from the target range, or even if the intermediate position is displaced toward the body raising side or body lowering side from the target range, the vehicle height may be viewed as being in the specified height range as long as the number of times that the intermediate position departs from the target range does not exceed the specified number of times. Accordingly, it is judged that there is no need to actuate the operation changing unit.

Accordingly, in cases where an operation changing unit is provided for the suspension mechanism in the work vehicle suspension structure, the operating frequency of the operation changing unit can be reduced, a construction that is advantageous from the standpoint of the durability of the operation changing unit can be obtained, and the durability of the operation changing unit can be improved.

In the abovementioned work vehicle suspension structure as well, it is ideal if the suspension mechanism is constructed from a hydraulic cylinder; an accumulator is connected to the oil chamber of the hydraulic cylinder; the operation changing unit has a control valve which is connected to an oil path connecting the accumulator and oil chamber of the hydraulic cylinder, and that is capable of supplying and discharging operating oil from a pump; and the operation of the suspension mechanism is changed to the raising side of the body or lowering side of the body as a result of the control valve controlling the pressure of the oil chamber of the hydraulic cylinder.

BRIEF DESCRIPTION OF THE DRAWINGS

FIG. 7 is a diagram showing the flow of the control of the hydraulic cylinder of a first modification of this embodiment of the present invention.

DESCRIPTION OF THE PREFERRED EMBODIMENTS

[1]

Figure 1:
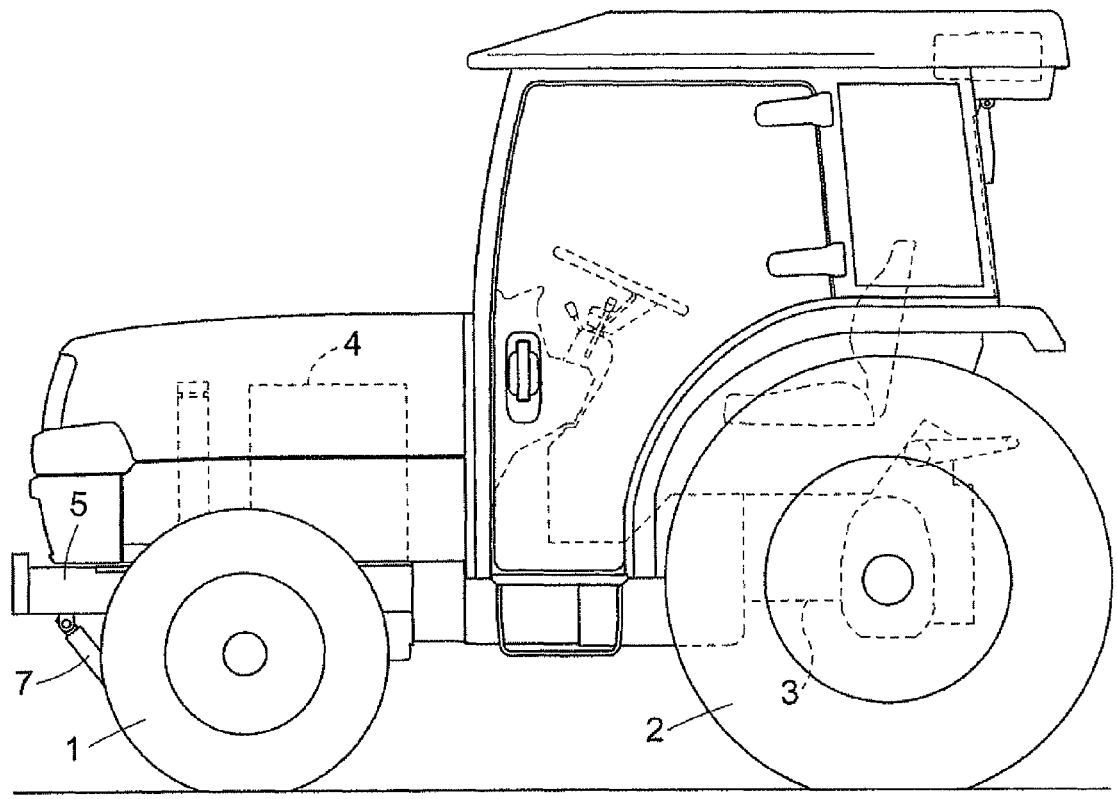
FIG. 1 is an overall side view of a farm tractor.

As is shown in FIG. 1, a farm tractor which is one example of a work vehicle is provided with right and left front wheels 1 and right and left rear wheels 2. The right and left rear wheels 2 are supported in a position-fixed state on the transmission case 3 on the rear part of the body without being supported via a suspension mechanism.

Figure 2:
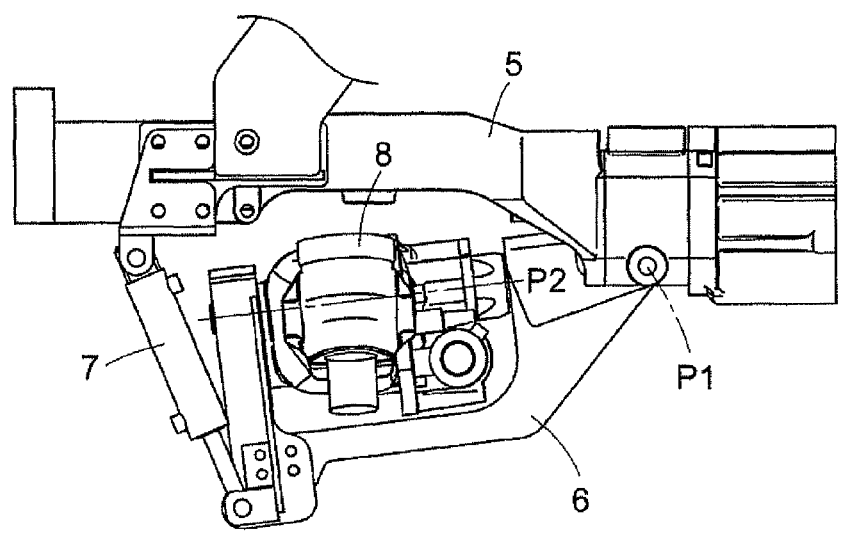
FIG. 2 is a side view of the area in the vicinity of the front wheel axle case, supporting bracket, and hydraulic cylinder.
Figure 4:
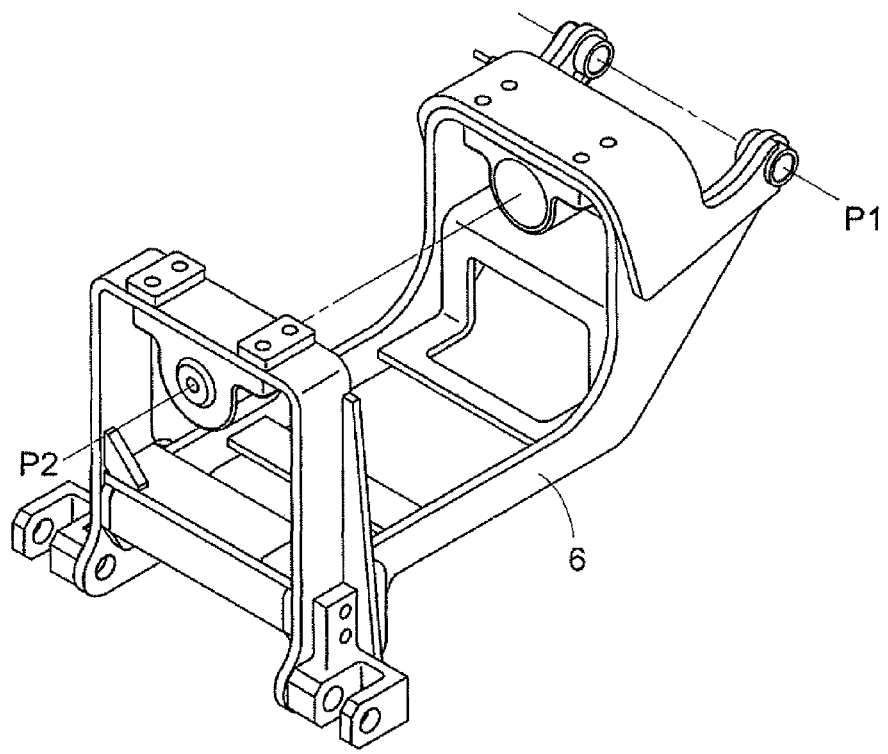
FIG. 4 is a perspective view of supporting bracket.

As is shown in FIGS. 1, 2, and 4, a supporting frame 5 is connected to the lower part of an engine 4 disposed on the front part of the body. This extends forward, and a supporting bracket 6 which has a U shape as seen in a side view is supported so as to allow unrestricted swinging upward and downward about a horizontal axis P1 in the rear part of the supporting frame 5. Two hydraulic cylinders 7 (corresponding to the suspension mechanism) are connected to the front part of the supporting frame 5 and the front part of the supporting bracket 6. A front axle case 8 is supported so that this case is free to roll about the front-rear axis P2 of the supporting bracket 6, and the right and left front wheels 1 are supported on the right and left front parts of the axle case B.

[2]

Next, the hydraulic circuit structure of the hydraulic cylinders 7 will be described.

Figure 3:
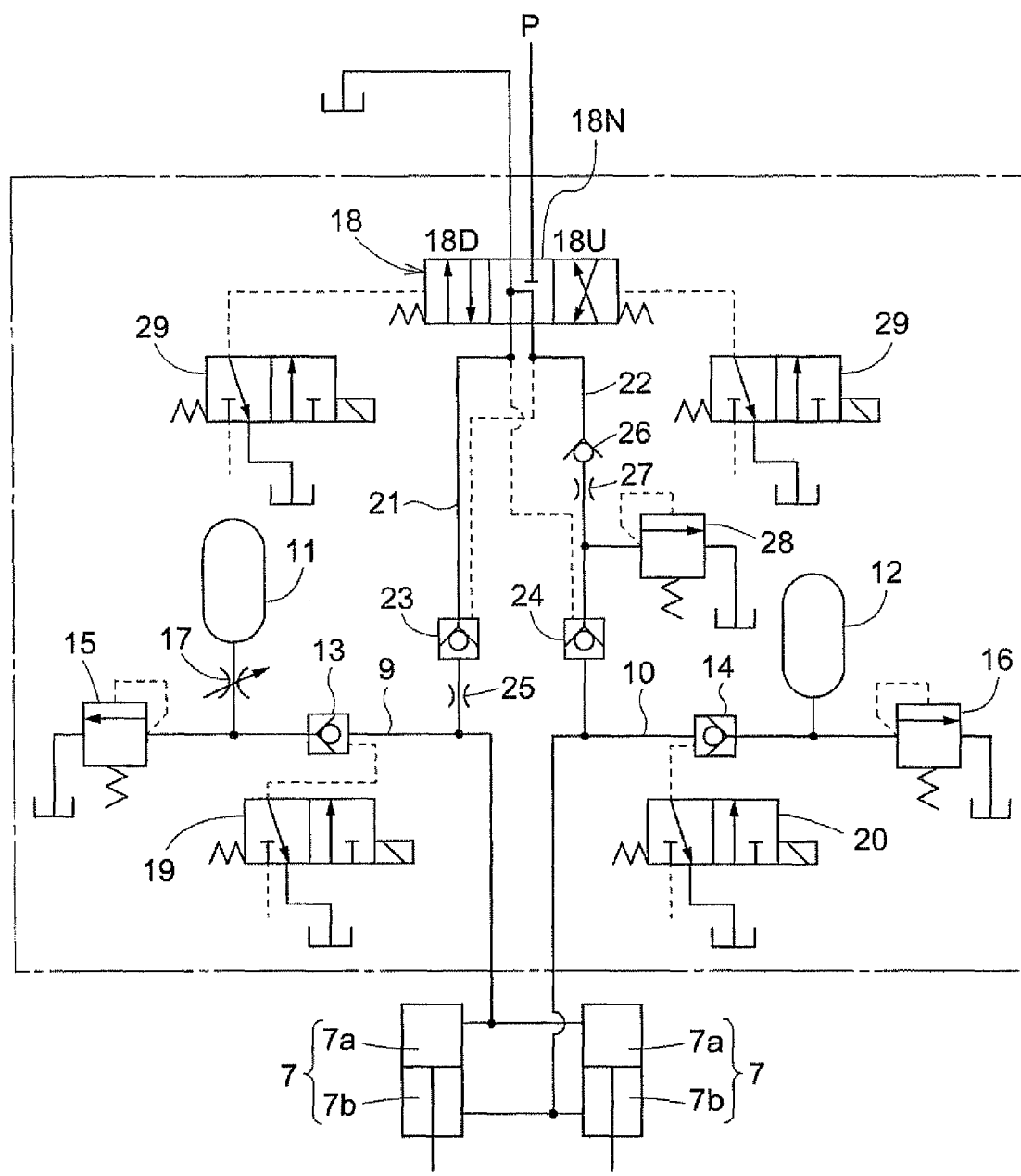
FIG. 3 is a diagram showing the hydraulic circuit structure of the hydraulic cylinder.

As is shown in FIG. 3, the hydraulic cylinders 7 are constructed as double action type cylinders which are provided with a bottom side oil chamber 7a and a piston side oil chamber 7b. A gas-sealing accumulator 11, a pilot operating system check valve 13, and a relief valve 15 used for hydraulic circuit protection are connected to the oil path 9 that is connected to the oil chamber 7a of the hydraulic cylinders 7. A variable diaphragm part 17 is also provided on the front part of the accumulator 11. A gas-sealing accumulator 12, a pilot operating system check valve 14, and a relief valve 16 used for hydraulic circuit protection are connected to the oil path 10 that is connected to the oil chamber 7b of the hydraulic cylinders 7.

As is shown in FIG. 3, pilot valves 19 and 20 which supply and discharge pilot operating oil to the check valves 13 and 14 are provided; the check valves 13 and 14 are placed in an actuated state (a state in which the flow of operating oil from the accumulators 11 and 12 to the oil chambers 7a and 7b of the hydraulic cylinders 7 is allowed, and the flow of operating oil from the oil chambers 7a and 7b of the hydraulic cylinders 7 to the accumulators 11 and 12 is prevented) or an open state (a state in which the flow of operating oil from the accumulators 11 and 12 to the oil chambers 7a and 7b of the hydraulic cylinders 7 and from the oil chambers 7a and 7b of the hydraulic cylinders 7 to the accumulators 11 and 12 is allowed). In this case, a construction may also be used in which two pilot valves 19 and 20 are not provided, and the check valves 13 and 14 are placed in an actuated state or open state by a single pilot value (not shown).

As is shown in FIG. 3, a control valve 18 (corresponding to the operation changing means) which supplies and discharges operating oil from a pump (not shown) is provided, and an oil path 21 is connected across the control valve 18 and the portion between the oil chamber 7a of the hydraulic cylinders 7 and the check valve 13 in the oil path 9; furthermore, an oil path 22 is connected across the control valve 14 and the portion between the oil chamber 7b of the hydraulic cylinders 7 in the oil path 10. The control valve 18 is constructed as a three-position switching pilot operating system with a raised position 18U that supplies operating oil to the oil path 21 (oil chamber 7a of the hydraulic cylinders 7), a lowered position 18D which supplies operating oil to the oil path 22 (oil chamber 7b of the hydraulic cylinders 7), and a neutral position 18N. A pilot valve 29 which operates the control valve 18 is provided.

As is shown in FIG. 3, a check valve 23 and a diaphragm part 25 are provided in the oil path 21. A pilot operating system check valve 24, check valve 26 (the check valve 24 is on the side of the oil path 10, and the check valve 26 is on the side of the control valve 18), and a diaphragm part 27 are provided in the oil path 22; and a relief valve 28 is connected between the check valve 24 and check valve 26 (diaphragm part 27).

The pilot valves 19, 20 and 29 have an electromagnetic operating system, and as will be described in [3] and [4] below, the pilot valve 19 (control valve 18) and pilot valves 20, 29 are operated by a control device (not shown).

[3]

Next, the operation of the hydraulic cylinders 7 will be described.

In the structure described in [2], as is shown in FIG. 3, in cases where the control valve 18 is in the neutral position 18N, and the check valves 13 and 14 are placed in an open state, when the front axle case 8 and supporting bracket 6 swing upward or downward about the horizontal axis P1 in accordance with indentations and protrusions in the ground surface, the hydraulic cylinders 7 extend or retract, operating oil moves reciprocatingly between the oil chambers 7a, 7b of the hydraulic cylinders 7 and the accumulators 11, 12; and the hydraulic cylinders 7 act as a suspension mechanism with a spring constant of K1.

In this case, the pressure in the oil chamber 7b of the hydraulic cylinders 7 and the oil path 10 is maintained at the set pressure of MP1 by the relief valve 28. The following equation (11)

$$M \times g = PH \times AH - MP1 \times AR \qquad \text{(Eq. 1)}$$

where PH is the pressure in the oil chamber 7a of the hydraulic cylinders 7, AH is the pressure-receiving area of the piston of the oil chamber 7a of the hydraulic cylinders 7, AR is the pressure-receiving area of the piston in the oil chamber 7b of the hydraulic cylinder 7 (AR is smaller than AH by the load of the piston), M is the weight applied to the front part of the body (weight applied to the hydraulic cylinders 7), and g is the gravitational acceleration.

Consequently, since the pressure MP1 of the oil chamber 7b of the hydraulic cylinders 7, the pressure-receiving area AH of the piston of the oil chamber 7a of the hydraulic cylinders 7, and the pressure-receiving area AR of the piston of the oil chamber 7b of the hydraulic cylinders 7 are fixed, the pressure PH of the oil chamber 7a of the hydraulic cylinders 7 is higher than the pressure MP1 of the oil chamber 7b of the hydraulic cylinders 7, and varies according to the weight applied to the front part of the body (the weight applied to the hydraulic cylinders 7).

The spring constant K1 of the hydraulic cylinders 7 is determined by the pressures PH and MP1 of the oil chambers 7a and 7b of the hydraulic cylinders 7. This constant increases as the pressure PH of the oil chamber 7a of the hydraulic cylinders 7 increases, and decreases as the pressure PH of the oil chamber 7a of the hydraulic cylinders 7 decreases. Accordingly, the spring constant K1 of the hydraulic cylinders 7 is determined by the weight applied to the front part of the body (the weight applied to the hydraulic cylinders 7) M; this increases as the weight applied to the front part of the body (weight applied to the hydraulic cylinders 7) M increases, and decreases as the weight applied to the front part of the body (weight applied to the hydraulic cylinders 7) M decreases.

As is shown in FIG. 3, when the control valve 18 is placed in the raised position 18U, and the check valves 13 and 14 are placed in an operating state, operating oil is supplied from the control valve 18 to the oil chamber 7a of the operating cylinders 7, and operating oil from the oil chamber 7b of the hydraulic cylinders 7 is discharged via the check valve 24 (which is placed in an open state by pilot operating oil of the control valve 18) and relief valve 28. In this case, the pressure in the oil chamber 7b of the hydraulic cylinders 7 and the oil path 10 is maintained at the set pressure MP1 by the relief valve 28.

Consequently, the hydraulic cylinders 7 extend, and the front part of the body is raised (this corresponds to a state in which the operation of the hydraulic cylinders 7 (suspension mechanism) is changed toward the body raising side). Subsequently, when the control valve 18 is placed in the neutral position 18N, and the check valves 13 and 14 are placed in an open state, the hydraulic cylinders 7 act as a suspension mechanism as described above with the hydraulic cylinders 7 in an extended state.

As is shown in FIG. 3, when the control valve 18 is placed in the lowered position 18D, and the check valves 13 and 14 are placed in an operating state, operating oil is supplied from the control valve 18 to the oil chamber 7b of the hydraulic cylinders 7, and operating oil is discharged from the oil chamber 7a of the hydraulic cylinders 7 via the check valve 23 (which is placed in an open state by the pilot pressure of the control valve 18), diaphragm part 25, and control valve 18. In this case, the pressure in the oil chamber 7b of the hydraulic chambers 7 and the oil path 10 is maintained at the set pressure MP1 by the relief valve 28.

Consequently, the hydraulic cylinders 7 retract, and the front part of the body is lowered (this corresponds to a state in which the hydraulic cylinders 7 (suspension mechanism) are changed toward the body lowering side). Subsequently, when the control valve 18 is placed in the neutral position 18N, and the check valves 13 and 14 are placed in an open state, the hydraulic cylinders 7 act as a suspension mechanism as described above with these hydraulic cylinders 7 in a retracted state.

[4]

Next, the control of the hydraulic cylinders 7 will be described with reference to FIGS. 3, 5, and 6.

An operating position sensor (not shown) that detects the operating position (extended or retracted position) of the hydraulic cylinders 7 is provided, detection values from this operating position sensor are input into a control device, and the operating position (extended or retracted position) of the hydraulic cylinders 7 is stored in the control device.

In this case, the extension-retraction type operating position sensor is attached directly to the hydraulic cylinders 7, and the operating position (extended or retracted position) of the hydraulic cylinders 7 is detected, or a rotary type operating position sensor is attached to a position on the horizontal axis P1 shown in FIG. 2, and the operating position (extended or retracted position) of the hydraulic cylinders 7 is detected by detecting the angle of the supporting bracket 6 with respect to the supporting frame 5.

Figure 5:
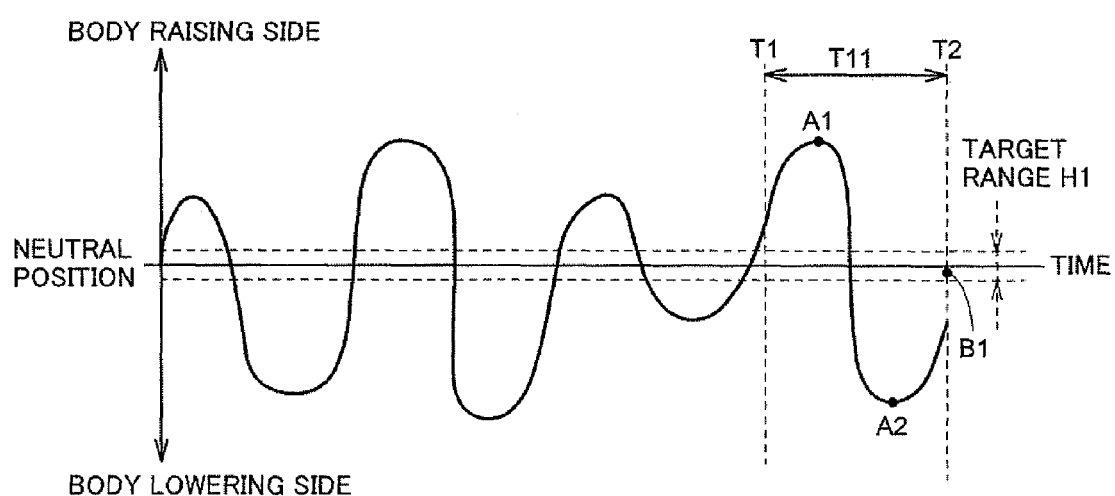
FIG. 5 is diagram showing the state of the operating position (extended and retracted position) of the hydraulic cylinder.

As is shown in FIG. 5, the neutral position of the operation of the hydraulic cylinders 7 is set in the control device, and if the operating position (extended or retracted position) of the hydraulic cylinders 7 is the neutral position, the body is in a state that is substantially parallel to the road surface (substantially horizontal). A target range H1 which has a certain range on the body raising side and body lowering side with respect to the neutral position is set in the control device.

In a state in which the control valve 18 is placed in the neutral position 18N, and the check valves 13 and 14 are placed in an open state (a state in which the hydraulic cylinders 7 operate as a suspension mechanism) (step S1), the counting of the control period T12 is initiated (step S2), and the operating position (extended or retracted position) of the hydraulic cylinders 7 is detected and stored as described above (step S3).

When the control period T12 has elapsed (step S4) (see time T2 in FIG. 5), the maximum position A1 and minimum position A2 of the operation of the hydraulic cylinders 7 are detected from the operating positions (extended or retracted positions) of all of the hydraulic cylinders 7 in which a set time of T11 has passed from the time T2 (see time T2 to time T1 in FIG. 5) (step S5), and an intermediate position B1 between the maximum and minimum positions A1 and A2 (a center position between the maximum and minimum positions A1 and A2) is detected (step S6) (this corresponds to the neutral position detected unit).

As is shown in FIG. 5, the maximum position A1 is the position in which the operating position of the hydraulic cylinders 7 is displaced toward the body lowering side after being displaced toward the body raising side (the position at which the hydraulic cylinders 7 switch to a retraction operation from an extension operation). The minimum position A2 is the position in which the operating position of the hydraulic cylinders 7 is displaced toward the body raising side after being displaced toward the body lowering side (the position at which the hydraulic cylinders 7 switch to an extension operation from a retraction operation).

In this case, the operating position (extended or retracted position) of the hydraulic cylinders 7 from the time at which the previous control period T12 elapses to the time at which the current control period T12 elapses (see time T2 in FIG. 5) is stored as the new operating position (extended or retracted position) of the hydraulic cylinders 7, and the operating position of the hydraulic cylinders 7 further past the time T1 at which a set time of T11 has passed from the time T2 is erased; each time that the control period T12 has elapsed, some of the operating positions (extended or retracted positions) of the hydraulic cylinders 7 stored in the control device are updated.

In steps S4 and S5, when the set time T11 is set a little longer than a period equal to more than one period of the resonance frequency of the hydraulic cylinders 7 (suspension mechanism), a single maximum position A1 and a single minimum position A2 are detected during the set time T11. In this case, the intermediate position B1 is detected from the single maximum and single minimum positions A1 and A2 (step S6).

In steps S4 and S5, if the set time T11 is set as a time with a considerable length, a plurality of maximum positions A1 and a plurality of minimum positions A2 are detected during the set time T11. In this case, the largest maximum position A1 among the plurality of maximum positions A1 and the smallest minimum position A2 among the plurality of minimum positions A2 are detected, and the intermediate position B1 is detected from the largest maximum position A1 and smallest minimum position A2 (step S6).

When the intermediate position B1 is detected, the intermediate position B1 and target range H1 are compared (step S7). If the intermediate position B1 is inside the target range H1 (step S7), the control valve 18 is placed in the neutral position 18N, and a state in which the check valves 13 and 14 are placed in an open state (a state in which the hydraulic cylinders 7 operate as a suspension mechanism having a spring constant of K1) is maintained (step S1).

In step S7, if the intermediate position B1 departs toward the body lowering side from the target range H1, the front part of the body is lowered, it is judged that the body is in a front-downward state with respect to the ground surface, the control valve 18 is placed in the raised position 18U, and the check valves 13 and 14 are placed in an operating state (step S8) (this corresponds to the controller).

Consequently, as was described in the previous section [3], the hydraulic cylinders 7 are extended and the front part of the body is raised in a state in which the pressure of the oil chamber 7b of the hydraulic cylinders 7 and the oil path 10 is maintained at the set pressure MP1. When the hydraulic cylinders 7 are extended by an amount equal to the difference between the intermediate position B1 and the target range H1 (when the intermediate position B1 is inside the target range H1), the control valve 18 is placed in the neutral position 18N, and the system returns to a state in which the check valves 13 and 14 are placed in an open state (a state in which the hydraulic cylinders 7 operate as a suspension mechanism) (step S1).

In steps S7 and S8, the weight M applied to the front part of the body (weight applied to the hydraulic cylinders 7) by the working apparatus mounted on the front part of the body is increased (for example, in a state in which earth is excavated by a front loader), and if the front part of the body is lowered, the spring constant K1 of the hydraulic cylinders 7 is increased (see the previous section [3]). In this case, the damping force of the hydraulic cylinders 7 may be increased by operating the variable diaphragm part 17 shown in FIG. 3 toward the diaphragm side.

In step S7, when the intermediate position B1 departs from the target range H1 toward the body raising side, the front part of the body is raised, it is judged that the body is in a front-raised state with respect to the ground surface, the control valve 18 is placed in the lowered position 18D, and the check valves 13 and 14 are placed in an operating state (step S9) (this corresponds to the control pat).

Consequently, as was described in the previous section [3], the hydraulic cylinders 7 are retracted and the front part of the body is lowered in a state in which the pressure of the oil chamber 7b of the hydraulic cylinders 7 and the oil path 10 is maintained at a set pressure of MP1 by the relief valve 28. When the hydraulic cylinders 7 are retracted by an amount corresponding to the difference between the intermediate position B1 and the target range H1 (when the intermediate position B1 is inside the target range H1), the control valve 18 is placed in the neutral position 18N, and the system returns to a state in which the check valves 13 and 14 are placed in an open state (a state in which the hydraulic valves 7 act as a suspension mechanism) (step S1).

In steps S7 and S9, the weight M applied to the front part of the body (weight applied to the hydraulic cylinders 7) is reduced by the working apparatus mounted on the front part of the body (for example, in a state in which earth is excavated by a front loader), and if the front part of the body is raised, the spring constant K1 of the hydraulic cylinders 7 is lowered (see the previous section [3]). In this case, the damping force of the hydraulic cylinders 7 may be lowered by operating the variable diaphragm part 17 shown in FIG. 3 toward the open side.

First Modified Embodiment of the Invention

Figure 6:
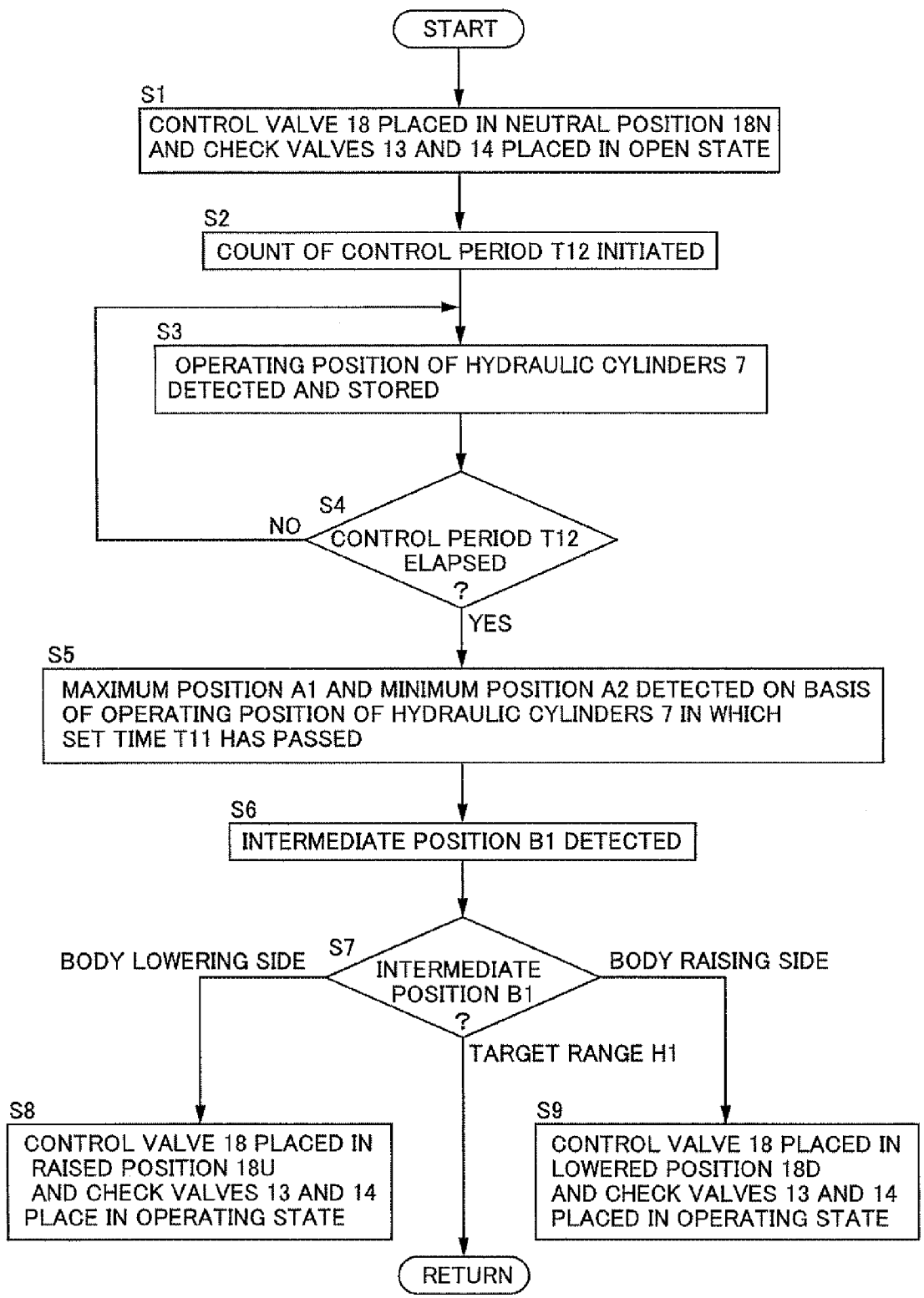
FIG. 6 is a diagram showing the flow of the control of the hydraulic cylinder.

A construction such as that shown in FIG. 7 may also be used instead of the construction shown in FIG. 6 of the previous "Preferred Embodiments of the Invention".

As is shown in FIG. 7, a number of times of calculation N is set in the control device, and the number of times of calculation N is first set at "0" (step S10). The control valve 18 is set in the neutral position 18N, steps S12 through S16 similar to steps S2 through S6 in FIG. 6 are performed in a state in which the check valves 13 and 14 are placed in an open state (a state in which the hydraulic cylinders 7 are operated as a suspension mechanism (step S11), and the intermediate position B1 is detected.

When the intermediate position B1 is detected, the intermediate position B1 and the target range H1 are compared (step S17), and if the intermediate position B1 departs from the target range H1 on the body lowering side, "1" is subtracted from the calculated number of times N (step S18); if the intermediate position B1 departs from the target range H1 on the body raising side, "1" is added to the calculated number of times N (step S19) (corresponding to the calculation unit), and if the intermediate position B1 is inside the target range H1 (step S17), no addition or subtraction is performed with respect to the calculated number of times N.

Next, the processing goes to step S12, steps S12 through S16 are performed, the intermediate position B1 is detected, the intermediate position B1 is compared with the target range H1, addition or subtraction is performed with respect to the calculated number of times N, the processing again goes to step S12, and steps S12 through S16 are repeated.

After steps S12 through S16 have been repeated as described above, if the calculated number of times N reaches (falls below) a set number of times ND1 on the lowering side (step S20), the front part of the body is lowered, it is judged that the body has assumed a front-lowered state with respect to the ground surface, the control valve 18 is placed in the raised position 18U, and the check valves 13 and 14 are placed in an operating state (step S22) (corresponding to the controller).

Consequently, as was described in the previous section [3], the hydraulic cylinders 7 are extended and the front part of the body is raised in a state in which the pressure in the oil chamber 7b of the hydraulic cylinders 7 and the oil path 10 are maintained at the set pressure of MP1 by the relief valve 28. When the hydraulic cylinders 7 are extended by an amount equal to the difference between the intermediate position B1 and the target range H1 (when the intermediate position B1 is inside the target range H1), the control valve 18 is placed in the neutral position 18N, and the system returns to a state in which the check valves 13 and 14 are placed in an open state (a state in which the hydraulic cylinders 7 act as a suspension mechanism) (step S11).

After steps S12 through S16 have been repeated as described above, if the calculated number of times N reaches (exceeds) the set number of times NU1 on the raising side (step S21), the front part of the body is raised, it is judged that the body has assumed a front-raised state with respect to the ground surface, the control valve 18 is placed in the lowered position 18D, and the check valves 13 and 14 are placed in an operating state (step S23) (corresponding to the controller).

Consequently, as was described in the previous section [3], the hydraulic cylinders 7 are retracted and the front part of the body is lowered in a state in which the pressure in the oil chamber 7b of the hydraulic cylinders 7 and the oil path 10 is maintained at the set pressure MP1 by the relief valve 28. When the oil cylinders 7 are retracted by an amount corresponding to the difference between the intermediate position B1 and the target range H1 (when the intermediate position B1 is inside the target range H1), the control valve 18 is placed in the neutral position 18N, and the system returns to a state in which the check valves 13 and 14 are placed in an open state (a state in which the hydraulic cylinders 7 act as a suspension mechanism) (step S11).

If the calculated number of times N does not reach (fall below) the set number of times ND1 on the lowering side (step S20), and the calculated number of times NU on the raising side does not reach (exceed) the set number of times NU1 on the raising side (step S21) even though steps S12 through S16 are repeated as described above, the control valve 18 is placed in the neutral position 18N, and a state in which the check valves 13 and 14 are placed in an open state (a state in which the hydraulic cylinders 7 act as a suspension mechanism) continues to be maintained.

Second Modified Embodiment of the Invention

In cases where the set time T11 is set as a slightly longer time in steps S2 through S6 in FIG. 6 in the "Preferred Embodiments of the Present Invention" and steps S12 through S16 in FIG. 7 of the "First Modified Embodiment of the Present Invention", and a construction is used which detects a plurality of maximum positions A1 and a plurality of minimum positions A2, the neutral position B1 in step 6 of FIG. 6 and step S16 of FIG. 7 may be detected as followed.

(1) In a plurality of maximum positions A1 and a plurality of minimum positions A2, a single maximum position A1 and a single minimum position A2 are taken as one set. These are divided into a plurality of sets of maximum and minimum positions A1 and A2; a plurality of intermediate positions B1 are detected by detecting an intermediate position B1 in each set, and the average value of the plurality of intermediate positions B1 is taken as the intermediate position B1 in step S6 of FIG. 6 and step S16 of FIG. 7.

(2) The average value of the maximum positions A1 in a plurality of maximum positions A1 is detected, the average value of the minimum positions A2 in a plurality of minimum positions A2 is detected, the intermediate position B1 is detected from the average value of the maximum and minimum positions A1 and A2, and this is taken as the intermediate position B1 in step S6 of FIG. 6 and step S16 of FIG. 7.

Third Modified Embodiment of the Present Invention

Rather than set the intermediate position B1 at the center position of the maximum and minimum positions A1 and A2 in the "Preferred Embodiments of the Present Invention", "First Modified Embodiment of the Present Invention", and "Second Modified Embodiment of the Present Invention", the intermediate position B1 may be set at a position slightly on the body raising side (extension side of the hydraulic cylinders 7) from the center position between the maximum and minimum positions A1 and A2 on the basis of the presence or absence and type of the working apparatus mounted on the front part of the body (e.g., front loader), working configuration or the like, or is set at a position slightly on the body lowering side (retraction side of the hydraulic cylinders 7) from the center position between these maximum and minimum positions A1 and A2.

For example, in cases where a working apparatus (e.g., front loader) is mounted on the front part of the body, the body may be set in a slightly front-raised state with respect to the ground surface by setting the intermediate position B1 at a position that is slightly on the body raising side from the center position between the maximum and minimum positions A1 and A2.

What is claimed is:

1. A suspension structure for a work vehicle comprising:
   an operation changing unit which has a suspension mechanism for vehicle operation and which allows the operation of the suspension mechanism to be changed to a body raising side or body lowering side;
   a center position detection unit for detecting a maximum position and minimum position of the operation of the suspension mechanism, and detecting a center position between the maximum position and minimum position; and
   a controller for operating the operation changing unit;
   wherein the controller operates the operation changing unit so that the center position moves toward a target range when the center position departs from the target range.

2. The suspension structure for a work vehicle according to claim 1, wherein:
   the suspension mechanism is constructed from a hydraulic cylinder;
   an accumulator is connected to an oil chamber of the hydraulic cylinder;
   the operation changing unit has a control valve that is connected to an oil path connecting the accumulator and the oil chamber of the hydraulic cylinder, and that is capable of supplying and discharging operating oil from a pump; and
   the operation of the suspension mechanism is changed to the raising side of the body or lowering side of the body as a result of the control valve controlling the pressure of the oil chamber of the hydraulic cylinder.

3. A suspension structure for a work vehicle comprising:
   an operation changing unit which has a suspension mechanism for vehicle operation and which allows the operation of the suspension mechanism to be changed to a body raising side or a body lowering side;
   a center position detection unit for detecting a maximum position and minimum position of the operation of the suspension mechanism, and detecting a center position between the maximum position and minimum position;
   a calculation unit for calculating a number of times that the center position departs from a target range; and
   a controller for operating the operation changing unit;
   wherein the controller operates the operation changing unit so that the center position moves toward the target range when the number of times that the center position departs from the target range exceeds a set number of times.

4. The suspension structure for a work vehicle according to claim 3, wherein:
   the suspension mechanism is constructed from a hydraulic cylinder;
   an accumulator is connected to an oil chamber of the hydraulic cylinder;
   the operation changing unit has a control valve that is connected to an oil path connecting the accumulator and the oil chamber of the hydraulic cylinder, and that is capable of supplying and discharging operating oil from a pump; and
   the operation of the suspension mechanism is changed to the raising side of the body or lowering side of the body as a result of the control valve controlling the pressure of the oil chamber of the hydraulic cylinder.

5. The suspension structure for a work vehicle according to claim 1, wherein the center position detection unit detects the center position between the maximum position and minimum position of all of extended/retracted positions of the suspension mechanism detected during a set period retroacted from a set point of time.

6. The suspension structure for a work vehicle according to claim 3, wherein the center position detection unit detects the center position between the maximum position and minimum position of all of extended/retracted positions of the suspension mechanism detected during a set period retroacted from a set point of time.

* * * * *